United States Patent
Phelps, Jr. et al.

[15] 3,656,975
[45] Apr. 18, 1972

[54] COATING COMPOSITION

[72] Inventors: Fred L. Phelps, Jr., North Wales; James M. Klotz, Quakertown, both of Pa.

[73] Assignee: Teleflex Incorporated, North Wales, Pa.

[22] Filed: Feb. 16, 1970

[21] Appl. No.: 11,884

[52] U.S. Cl. ................................106/1, 106/14, 106/84, 117/131, 117/135.1
[51] Int. Cl. ................................................C09d 5/10
[58] Field of Search ................106/1, 14, 84; 117/135.1, 131

[56] References Cited

UNITED STATES PATENTS

| | | | |
|---|---|---|---|
| 2,462,763 | 2/1949 | Nightingall | 117/127 |
| 3,093,493 | 6/1963 | von Freyhold | 106/14 |
| 3,180,746 | 4/1965 | Patton et al. | 106/14 X |
| 3,297,616 | 1/1967 | Fisher et al. | 106/14 X |

*Primary Examiner*—Lorenzo B. Hayes
*Attorney*—McGlynn, Reising, Milton & Ethington, Gerald E. McGlynn, Jr., Martin J. Adelman, Allen M. Krass, Owen E. Perry, Thomas N. Young and Stanley C. Thorpe

[57] ABSTRACT

The coating composition of this invention consists essentially of a dispersion of aluminum powder and zinc oxide in an aqueous solution of soluble alkali metal silicate containing dissolved chromate. The relative proportions of the ingredients in the preferred compositions are in the range of from about 100 to 500 grams aluminum powder and 30 to 100 grams zinc oxide per liter aqueous solution containing from about 200 to 1200 grams alkali metal silicate and from about 1 to 5 grams chromate. After application the coating compositions of this invention are cured to water insolubility by heat. The compositions are ideally suited for coating metals, particularly ferrous base metal, and provide excellent corrosion and abrasion resistance.

2 Claims, No Drawings

3,656,975

COATING COMPOSITION

This invention relates to a coating composition and method and more specifically to improved pigmented soluble silicate base coating composition which provides increased corrosion and abrasion resistance.

Pigmented aqueous soluble silicate base coating compositions are well known in the art, perhaps the most common type being that wherein powdered zinc metal is used as the suspended finely divided pigment material. Various additional ingredients have been used and modifications suggested for improvement, particularly in the shelf life of the coating compositions. The shelf life problem stems principally from the reactivity of the pigment material with the aqueous soluble silicate.

We have now discovered that a marked improvement can be obtained in shelf life and also, and more importantly, in the corrosion and abrasion resistance, by using as the pigment material aluminum powder plus zinc oxide, and, in combination with this, by including chromate in the aqueous soluble silicate solution. Hence, the coating composition of this invention consists essentially of a suspension of aluminum powder and finely divided zinc oxide in an aqueous alkali metal silicate solution containing dissolved chromate. In the preferred compositions the relative amounts of the various ingredients are from about 100 to 500 grams aluminum powder and from about 30 to 100 grams zinc oxide powder per liter of aqueous solution containing from about 200 to 1200 grams sodium silicate or potassium silicate or a combination of the two, preferably sodium silicate, and from about 1 to 5 grams chromic acid. The following specific example of a preferred embodiment will serve to further illustrate:

Sodium silicate solution 3,000 cc. (43 percent by weight sodium silicate solids, remainder water, soda-to-silica ratio 1 to 3.2; specific gravity about 1.48) Additional water 650 cc.
Chromic Acid 12 grams
Aluminum Powder 1300 grams
Zinc Oxide 250 grams The aluminum powder should preferably be generally spherical shaped, as distinguished from aluminum flakes, and of very small grain size, ideally less than 10 microns.

The alkali metal-to-silica ratio of the alkali metal silicate is not critical; however, we prefer to use sodium silicate with a soda-to-silica ratio of approximately 1- 3.

Chromic acid is preferred for supplying the chromate ion to the aqueous solution though soluble chromate salts such as sodium or potassium dichromate or chromate may be used if desired.

In preparation of the composition the aqueous solution of the soluble silicate and chromate is first prepared after which the aluminum powder and zinc oxide are added to form the suspension. The composition can be applied by any of the conventional techniques such as by dipping or spraying. After application the coating is dried and cured to water insolubility by heating. The higher the temperature used for curing the less the time required and we have successfully cured at temperatures of from 200° F. to 800° F. It is preferred that the applied coating be fully dried at relatively low temperature, preferably less than 150° F., prior to the application of higher heats to effect the curing to water insolubility. For optimum results it is desirable to raise the temperature, to the maximum used, relatively slowly. The following is a typical curing schedule for the composition set forth in the above example: hold at about 100° F. until the coating is dry; heat for two hours at about 150° F., heat for an additional hour at about 175° F., heat for an additional hour at about 200° F., heat for an additional hour at about 360° F., and then heat for an additional hour at about 600° F. As indicated above, lower or higher curing temperatures can be used as well as different temperature-time curing schedules.

The coatings of this invention are particularly good for use on ferrous and other metals to provide corrosion, erosion and abrasion resistance.

We claim:
1. A coating composition consisting essentially of a mixture of aluminum powder and zinc oxide in an aqueous solution of from about 200 to 1,200 grams per liter soluble alkali metal silicate selected from a group consisting of sodium silicate, potassium silicate and mixtures thereof, said solution also containing from about 1 to 5 grams per liter dissolved chromate, said zinc oxide being present in an amount of from about 3 to 100 grams per liter of said aqueous solution and said aluminum powder being of generally spherical shape having a grain size of less than about 10 microns and being present in an amount of from about 100 to 500 grams per liter of said aqueous solution.

2. A coating composition consisting essentially of a mixture resulting from the addition of about 1,300 grams aluminum powder, 250 grams zinc oxide, 12 grams chromate acid and 650 cc. water to about 3,000 cc. of an aqueous solution of sodium silicate containing about 43 percent by weight sodium silicate and having a specific gravity of about 1.48, said aluminum powder being of generally spherical shape and having a grain size of less than 10 microns.

* * * * *